(12) United States Patent
Freishtat et al.

(10) Patent No.: US 7,526,439 B2
(45) Date of Patent: Apr. 28, 2009

(54) SYSTEMS AND METHODS TO FACILITATE SELLING OF PRODUCTS AND SERVICES

(75) Inventors: Gregg S. Freishtat, Atlanta, GA (US); Paul Kaib, Dunwoody, GA (US); Stacey Doran, Cumming, GA (US); Jeffrey S. Dernavich, Atlanta, GA (US); Jackson L. Wilson, III, Atlanta, GA (US)

(73) Assignee: Proficient Systems, Incorporated, Atlanta, GA (US)

( * ) Notice: Subject to any disclaimer, the term of this patent is extended or adjusted under 35 U.S.C. 154(b) by 258 days.

(21) Appl. No.: 10/326,453

(22) Filed: Dec. 20, 2002

(65) Prior Publication Data

US 2003/0154120 A1    Aug. 14, 2003

Related U.S. Application Data

(63) Continuation-in-part of application No. 09/922,753, filed on Aug. 6, 2001.

(51) Int. Cl.
  *G06Q 30/00* (2006.01)
(52) U.S. Cl. .......................................... 705/26
(58) Field of Classification Search .................. 705/26, 705/27
See application file for complete search history.

(56) References Cited

U.S. PATENT DOCUMENTS 5,664,115 A    9/1997    Fraser (Continued)

FOREIGN PATENT DOCUMENTS

WO    WO 9922328    5/1999

OTHER PUBLICATIONS

C.J. prince, E: business: A Look at the Future, Chief Executive, vol. 154, Apr. 2000, pp. 10-11.*

(Continued)

*Primary Examiner*—Ronald Laneau
(74) *Attorney, Agent, or Firm*—Ballard Spahr Andrews & Ingersoll, LLP

(57) ABSTRACT

The system of the present invention provides systems and methods for selling goods and services in conjunction with the Internet. The system receives session information on a customer's website session from the enterprise's website and may also receive customer information on the customer from the enterprise. The system determines from the received information whether the customer represents a sales opportunity, based on a set of rules of engagement for the enterprise and whether the customer wants or could use assistance from a sales associate. The system further produces a ranked list of sales associates matched for each sales opportunity. A customer queue is created for each sales associate that has the sales opportunities matched with the sales associate. The system determines, for a first sales associate, a number of sales opportunities to approach at one time in the first sales associate's customer queue, automatically approaches the customers associated with each sales opportunity in the customer queue for the first sales associate and requests whether the customer desires assistance from a sales associate until the number of sales opportunities to approach is reached or the customer contacted previously requested assistance from a sales associate, receives responses from the customers, determines, for a response from a customer desiring assistance, if the first sales associate is available to assist the customer desiring assistance, and passes the customer desiring assistance to the first sales associate, if the first sales associate is available.

11 Claims, 12 Drawing Sheets

U.S. PATENT DOCUMENTS

| | | | |
|---|---|---|---|
| 5,710,887 A | 1/1998 | Chelliah et al. | |
| 5,715,402 A | 2/1998 | Popolo | |
| 5,732,400 A | 3/1998 | Mandler et al. | |
| 5,758,328 A | 5/1998 | Giovannoli | |
| 5,794,207 A | 8/1998 | Walker et al. | |
| 5,895,454 A | 4/1999 | Harrington | |
| 5,924,082 A | 7/1999 | Silverman et al. | |
| 5,958,014 A | 9/1999 | Cave | |
| 5,963,635 A | 10/1999 | Szlam | |
| 5,970,475 A | 10/1999 | Barnes et al. | |
| 5,991,740 A | 11/1999 | Messer | |
| 6,003,013 A | 12/1999 | Boushy | |
| 6,014,644 A | 1/2000 | Erickson | |
| 6,014,647 A | 1/2000 | Nizzari | |
| 6,016,504 A | 1/2000 | Arnold et al. | |
| 6,029,141 A | 2/2000 | Bezos et al. | |
| 6,044,146 A * | 3/2000 | Gisby et al. | 379/266.02 |
| 6,052,447 A | 4/2000 | Golden | |
| 6,052,730 A | 4/2000 | Felciano | |
| 6,061,658 A | 5/2000 | Chou | |
| 6,119,101 A | 9/2000 | Peckover | |
| 6,131,087 A | 10/2000 | Luke et al. | |
| 6,134,533 A | 10/2000 | Shell | |
| 6,141,653 A | 10/2000 | Conklin et al. | |
| 6,144,991 A * | 11/2000 | England | 709/205 |
| 6,163,607 A | 12/2000 | Bogart | |
| 6,170,011 B1 | 1/2001 | Macleod Beck et al. | |
| 6,189,003 B1 | 2/2001 | Leal | |
| 6,192,319 B1 | 2/2001 | Simonson | |
| 6,262,730 B1 | 7/2001 | Horvitz | |
| 6,292,786 B1 | 9/2001 | Deaton | |
| 6,334,110 B1 | 12/2001 | Walter | |
| 6,338,066 B1 | 1/2002 | Martin | |
| 6,349,290 B1 | 2/2002 | Horowitz | |
| 6,377,936 B1 | 4/2002 | Henrick | |
| 6,381,640 B1 * | 4/2002 | Beck et al. | 709/223 |
| 6,449,358 B1 | 9/2002 | Anisimov et al. | |
| 6,510,427 B1 | 1/2003 | Bossemeyer, Jr. | |
| 6,549,919 B2 | 4/2003 | Lambert | |
| 6,622,138 B1 | 9/2003 | Bellamkonda | |
| 6,665,395 B1 * | 12/2003 | Busey et al. | 379/265.09 |
| 6,725,210 B1 | 4/2004 | Key | |
| 6,741,995 B1 | 5/2004 | Chen | |
| 6,839,680 B1 | 1/2005 | Liu | |
| 6,865,267 B2 | 3/2005 | Dezonno | |
| 6,965,868 B1 * | 11/2005 | Bednarek | 705/9 |
| 7,092,959 B2 | 8/2006 | Chen | |
| 2001/0025249 A1 | 9/2001 | Tokunaga | |
| 2001/0032140 A1 | 10/2001 | Hoffman | |
| 2001/0054041 A1 | 12/2001 | Chang | |
| 2001/0056405 A1 | 12/2001 | Muyres | |
| 2002/0026351 A1 | 2/2002 | Coleman | |
| 2002/0038230 A1 | 3/2002 | Chen | |
| 2002/0046086 A1 | 4/2002 | Pletz | |
| 2002/0046096 A1 | 4/2002 | Srinivasan | |
| 2002/0047859 A1 * | 4/2002 | Szlam et al. | 345/705 |
| 2002/0083167 A1 * | 6/2002 | Costigan et al. | 709/224 |
| 2002/0123926 A1 | 9/2002 | Bushold et al. | 705/14 |
| 2002/0161620 A1 | 10/2002 | Hatanaka | |
| 2004/0034567 A1 | 2/2004 | Gravett | |

OTHER PUBLICATIONS

U.S. Appl. No. 60/213,378.*
International Search Report for PCT/US03/41090, date mailed Sep. 1, 2004.
International Search Report for PCT/US05/40012, date mailed Oct. 5, 2007.
Young, Deborah, "The Information Store," Sep. 15, 2000, Wireless Review, pp. 42, 44, 46, 48, 50.
Whiting, Rick; Sweat, Jeff, "Profitable Customers," Mar. 29, 1999, InformationWeek, Issue 727, pp. 44, 45, 48, 52, 56.
Bayer, Judy, "A Framework for Developing and Using Retail Promotion Response Models," Ceres Integrated Solutions, retrieved from http://www.ceresios.com/Analytical/promotio.htm.
Bayer, Judy, "Automated Response Modeling System for Targeted Marketing," Mar. 1998, Ceres Integrated Solutions.
Sweat, Jeff; Whiting, Rick, Instant Marketing, Aug. 2, 1999; InformationWeek pp. 18-20.
"SmarterKids.com Chooses Quadstone—The Smartest Customer Data Mining Solution," Jul. 31, 2000, Business Wire.
"NCR's Next Generation Software Makes True Customer Relationship Management a Reality," Jul. 26, 1999, PR Newswire.
"Quadstone System 3.0 Meets New Market Demand for Fast, East-to-use Predictive Analysis for CRM," May 22, 2000; Business Wire.
"Net Perceptions Alters Dynamics of Marketing Industry with Introduction of Net Perceptions for Call Centers," Oct. 12, 1998, PR Newswire.
"Ceres Targeted Marketing Application," Ceres Integrated Solutions; retrieved from http://www.ceresios.com/Products/index.html.

* cited by examiner

Figure 10

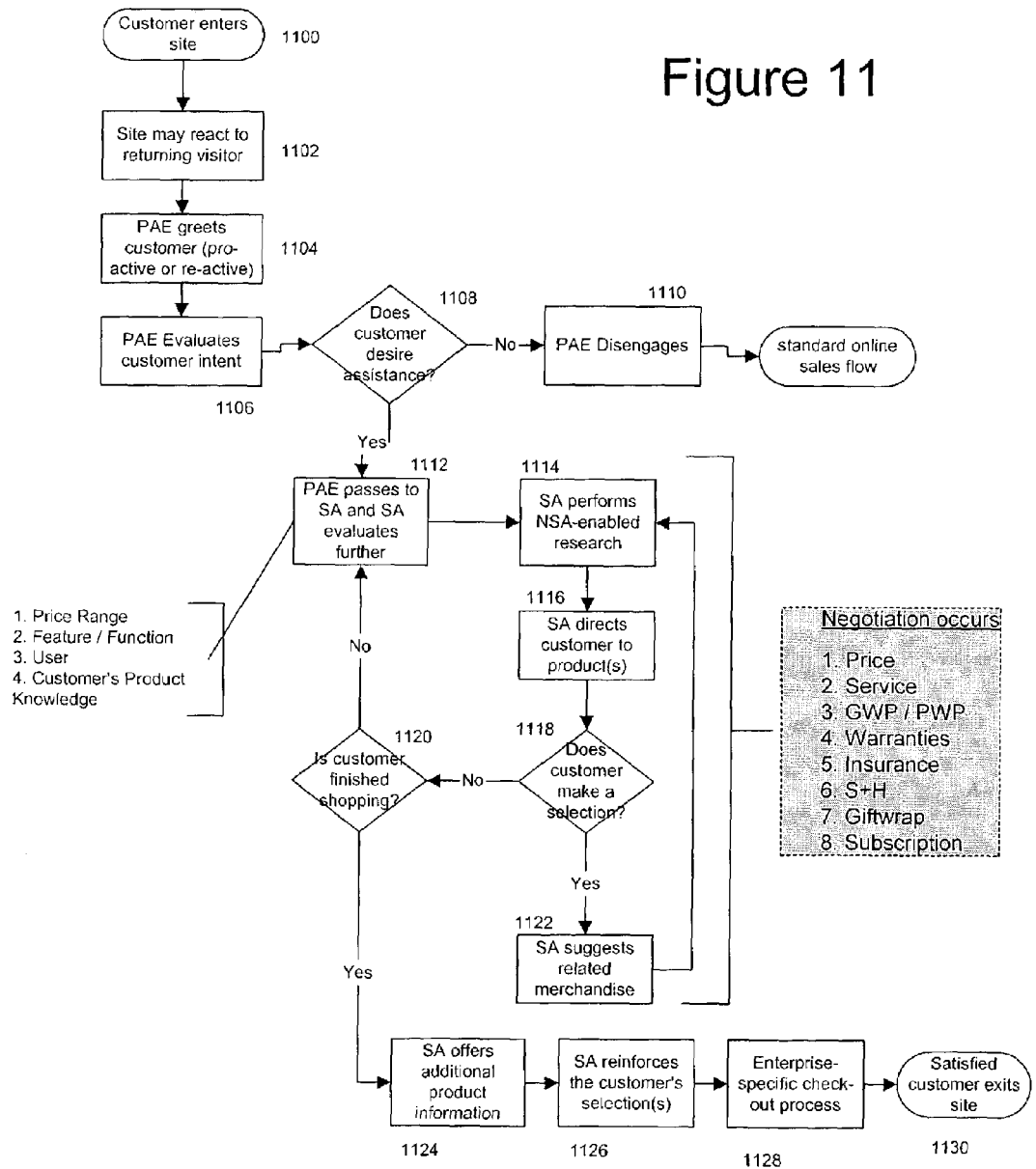
Figure 11
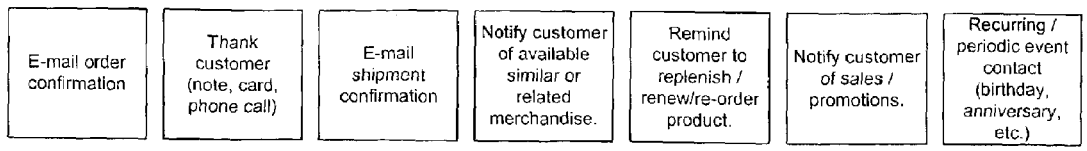

SYSTEMS AND METHODS TO FACILITATE SELLING OF PRODUCTS AND SERVICES

CROSS-REFERENCE TO RELATED APPLICATION

This application is a continuation in part of U.S. application Ser. No. 09/922,753, filed Aug. 6, 2001, which document is incorporated herein by this reference.

FIELD OF THE INVENTION

The present invention relates generally to electronic commerce, and more particularly to methods and systems to facilitate selling interactions that originate online.

BACKGROUND OF THE INVENTION

Electronic commerce, or "e-commerce," as it is commonly referred to, involves the sales of goods or services over, through or in conjunction with the Internet. Currently, e-commerce largely concerns the sale of goods or services that are relatively simple in terms of the product variability and complexity. Most consumer e-commerce today derives from just a few categories of goods that are simple enough that they can be presented in a catalog format. The customer does not need to consult with an expert in these goods or services before purchasing them. Thus, almost all Internet e-commerce sites today are sterile, pure self-service environments.

The complexity and variability of goods and services that sell online is increasing as greater numbers of enterprises of those goods seek to leverage the distributional efficiencies of the Internet. The increase in the complexity and variability of goods and services requires an increase in the consultative nature of the sales experience for the customer.

For example, in the travel category, most online purchasing activity currently relates to airline seats. When purchasing airline seats a customer has essentially two variables to deal with: (i) flight schedule and (ii) price. Otherwise, one airline seat is generally the same as any other. However, as the enterprises seek to sell exotic, luxury travel packages, such as safaris to Africa or boat trips through the Amazonian Rainforest over the Internet, the variables and the complexity of the sales process increases dramatically. For such a sale, a customer will want to know where to stay, what kinds of food to eat (and what kinds not to eat), whether the territory is considered dangerous or the trip is considered rigorous, whether special inoculations are required, and other complex questions. These questions demonstrate the added variety and complexity of the inputs necessary for the customer to make an informed purchase decision for this kind of service and they fundamentally require human interaction with a knowledgeable sales agent or product specialist to be answered in a meaningful way. The same type of complexity is inherent in the purchase of a variety of other goods and services including banking services (mortgages, retail banking, wealth planning), insurance services, electronics, luxury retail goods (fine watches, jewelry), automobiles and technology products and services (hardware, software and telecommunications products). Sale of these products requires a "trusted relationship" between a customer and a live sales expert who can use proven internal and external resources as collateral sales material to close the sale. Fundamentally, these products are sold, not just dropped in a shopping cart and purchased.

In the offline world today, purveyors of these complex goods and services strive to create comfortable retail environments in which knowledgeable personnel politely answer customers' questions about product and service features, capabilities, and alternatives, facilitate sales, and upsell related products and services, such as service warranties. For example, when shopping for a camera in an offline store, a sales associate will guide the customer toward the right camera, sell additional lenses, a case, batteries, a warranty, and perhaps some film before physically walking the customer to the cash register and closing the sale. E-commerce environments, by contrast, are almost completely self-service environments, notwithstanding the existence of Internet messaging ("chat products") and other technologies that facilitate fairly simple online interaction.

It is clear that there is a much higher level of interaction in the physical world. Customers have come to expect that there will be someone available in a physical location that can answer questions about products and direct them through the process. It is also frequently the case that a high-end shopper from a wealthy demographic is matched with a sales associate who, though otherwise skilled in the product to be sold, is mismatched with the demographic and psychographic characteristics of the buyer.

As enterprises attempt to increase the type and volume of goods and services bought through an online origination, the availability of knowledgeable expertise and assistance and relevant sales collateral materials must be addressed in order to persuade customers that they can obtain enough product-centric information to make buying over, through or in conjunction with the online channel an easy, pleasant experience that is equal or superior to shopping through other channels. Moreover, the Internet fundamentally changes the way goods and services are bought by customers. In the offline world, customers go to a store to buy a product; online, customers seek a product first, and then identify a store from which it can be purchased.

While a number of companies have extended existing call center technology into Internet sales environments in order to enable live voice or chat sessions with browsing customers, the Internet retail experience is still largely sterile and unsatisfying. Rather, the current online interaction focuses on customer service rather than sales—a significant distinction as customer services personnel are not well-suited to closing sales.

"Customer relationship management" ("CRM" or, as adopted for the online world, "eCRM") solutions providers have existed for several years now. However, few if any of these solutions facilitate meaningful, direct human interaction through the online channel. In fact, many CRM solutions that have offered call center support for catalogs and have simply extended their product offering to include Frequently Asked Questions ("FAQ"), e-mail and chat—features that most of the eCRM companies have in common. Many eCRM enterprises have thus chosen to focus on facilitating "touchless" e-commerce transactions, i.e., transactions that do NOT require human intervention.

Online chat or instant messaging is the most personalized and sophisticated mode of customer/sales associate interaction. Using platforms developed by companies like AOL, these programs facilitate real-time online chat between the two parties, occasionally allowing the sales representative to "push" web pages or content to the customer in order to guide the customer to products or information. Some eCRM companies take this one step further by offering voice over IP. With voice over IP, if the customer has the right equipment on her computer she can talk to a customer service representative via the Internet. Most of the programs require the customer to log in to the chat session, allowing the customer service representative to maintain a history of customer contact.

Some of the programs also allow the sales associate to view the complete customer purchase and communication history. Again, however, these platforms are typically staffed by customer service representatives and not sales associates and do not involve any "matching" of the right agent with the customer based on the agent's profile and skills, the customer's demographic and psychographic characteristics and the nature of the browsing opportunity.

FAQ services use historical "common" inquiries to generate template responses to customer questions. Some products go a step further and use artificial intelligence to analyze customer inquiries and generate "smart" answers. E-mail products also use gateway screening or artificial intelligence to answer customer questions in a more efficient manner than having a customer service representative personally respond to each question. Some e-mail programs also add direct e-mailing capabilities that can target and customize e-mail campaigns according to historical customer data. Some eCRM providers have product configurator applications. With these applications a customer is provided with a variety of questions regarding the features of the product they are interested in. Based on the answers to the questions the application will provide a suggestion as to the best configuration of the product for the customer. This solution is still a "touchless" experience from the standpoint of human interaction.

In general, CRM is reactionary—generally focused on post sale activity, such as, keeping existing customers, resolving problems, and managing customer relationships. CRM representatives are generalists, with no specific product or sales knowledge. By comparison, sales is proactive—focused on pre-sale activity, such as, obtaining customers, avoiding problems, creating customer relationships, and assisting customers in the purchase of goods or services. Sales associates are trained in the art of selling and posses specific and in-depth knowledge about goods and services.

Predictive dialer technology is known in the telemarketing setting. Telemarketers buy or subscribe to lists from a service which provides additional information about a household in addition to the telephone number. The accuracy and depth of this information is limited by tougher privacy statements by companies that customers have a relationship with, as well as the ability of the company to track changes in the data. Some simply plug in phone numbers from the phone book. Once the telephone numbers are input, the predictive dialer will determine agent availability and call the first number on the list. Upon detection that the call was answered, the system will find an available agent and pass the call to that agent. If the predictive dialer receives a busy signal, no answer, etc., then it will move on to the next number on the list. Such predictive dialer systems do not have the ability to determine if the called person is in the market for the products of the telemarketer or if a decision maker will answer the telephone. These predictive dialer systems also do not call at a critical time in the sales process. This technology has not been used in the e-commerce setting.

A system does not exist that (i) matches browsing customers with experienced, knowledgeable sales personnel and engaging such sales personnel with customers using a predictive approach function, (ii) provides relevant, opportunity-centric sales collateral information to the sales personnel and then (iii) facilitates the type of interaction between the customer and the sales person that is familiar in the offline world.

SUMMARY OF THE INVENTION

The present invention addresses the current lack of online sales assistance by creating the infrastructure to establish a system that allows accredited, experienced and product-knowledgeable sales personnel to sell goods and services (collectively, "products"), particularly complex, highly-consultative products, more effectively over, through, or in conjunction with online channels. The terms "over, through or in conjunction with the Internet," used singularly or in combination, contemplate sales that occur through the present invention that (i) are effected solely through online interaction, as well as sales that occur through the present invention that merely originate online or (ii) are captured online, such as through the present invention, but are consummated either through a telephone connection or in an offline (face-to-face) setting. With regard to the scenarios contemplated in item (ii) above, the present invention represents a bridge, or lead generation function, that connects online and offline selling.

As noted above, the system includes a rules-driven matching engine. The matching engine dynamically matches sales associates ("SAs") with online customers based on a variety of enterprise and/or system-driven criteria in order to ensure that the most qualified SA is matched with each customer (based on known data about the browsing session (the nature of the opportunity), the customer and the agent and his or her rankings, permissions and ratings as defined by the registration module). The relevant matching criteria are varied and include clickstream data, field values, geographic and demographic characteristics of the browser passed through login information or cookies, etc. The system permits the enterprise that is operating it to establish and weight these opportunity-matching parameters to achieve the best matches possible based on past experience with the system's or the enterprise's sales and marketing objectives. The matching engine additionally dynamically changes the matching criteria based on various factors, such as sales successes or changing market conditions. The matching engine ranks the SAs based on the matching criteria used and generates a list of SAs for that customer in rank order. The rules underlying the matching engine can be flexibly changed by the enterprise's staff to set different 'triggers' for SA/customer interaction in accordance with changes in the enterprise's sales and marketing strategy. In the offline world, a customer's encounter in a given shopping environment with the sales personnel available at that location is random, at best. For example, if an affluent consumer from the 30328 area code in Atlanta, Ga. enters a local bank branch seeking a complicated mortgage re-finance product, he may or may not encounter an appropriate expert available in the store at that time. In addition, he may or may not encounter an SA who knows how to address the needs and buying habits of affluent consumers. By comparison, in the financial institution's virtual storefront, the bank can effectively make its entire sales force available to handle all of the traffic encountered at the e-commerce site, but parse that traffic out to the most suitable SAs depending upon an array of variables: the type of product, the psychographic and demographic characteristics of both the customer and the SA, the sales skills of the SA in that product category and the SA's demonstrated ability to close a sale online. As a result, the enterprise is empowered to create far better "matches" between customers and its sales personnel in the online environment than is possible in the real world.

The mismatches of SA to opportunity, either in terms of the product expertise of the sales associate, or of the demographic and/or psychographic characteristics of the consumer and the sales associate, are addressed by the present invention. The present invention addresses this by matching product-specific SAs with browsing consumers based on (i) available data collected from the browser's interaction with the enterprise's website that is then passed to the system about the nature of the sales opportunity itself, (ii) geographic and demographic information about the customer, (iii) information about the proficiencies of the SAs in the enterprise's sales force (e.g., which ones sell well into these types of product opportunities to these types of customers) and (iv) the nature of the 'triggers,' or matching rules established by the enterprise.

The present invention includes a predictive approach engine. The predictive approach engine automatically identifies opportunities and proactively contacts customers for a specific, matched SA and asks whether the customers desire sales or other expert assistance from this SA. If the customer desires assistance, the predictive approach engine automatically connects the customer to the SA. The predictive approach engine can operate for an individual SA or for a group of SAs. The predictive approach engine significantly reduces the amount of time an SA will spend approaching customers and, instead, simply delivers those customers who have accepted the engagement to the SA's desktop. The predictive approach engine knows that the customer is interested in a particular product and can introduce an SA at a critical time in the sales process.

Virtually any enterprise that sells complex or consultative products or services and that has a website can benefit from the present invention. Many websites, such as auction sites and business to business exchange platforms, financial sites, travel sites, catering service sites, wholesale and retail sites, can benefit greatly from the present invention. Also, as noted above, there are benefits to the enterprise, in the form of additional data for managing the enterprise, that are effectively independent of the existence of the web site.

The online channel today is limited to merchandise that has certain commodity characteristics that are not so complex as to require sales people to close the sale. The present invention, by contrast, enhances the effectiveness of the online sales process particularly with respect to more complex, less commoditized offerings such as electronic equipment, automobiles, financial products (mortgages, car leases and other loans, insurance, wealth planning, mutual funds and securities), luxury products (such as fine food and wine, jewelry, cosmetics) and other merchandise and services that typically require a high-level of sales assistance. Thus, the present invention allows enterprises to substantially expand the categories of merchandise that can be effectively sold through or in conjunction with an online channel. Moreover, by allowing SAs to proactively approach browsers online, the present invention effectively allows enterprises to man their online presence with real people, who can then use the communication functionality offered through the present invention to address consumers' needs in real time, either for the purpose of closing the deal online or generating a 'hot lead' that can then be passed into the existing offline channel. Thus, the present invention effectively marries or bridges the online and offline selling processes, and allows the enterprise's existing "offline" human selling resources to be leveraged against online opportunities.

A major difference between current eCRM solutions and the present invention is that the present invention goes beyond existing CRM tactics by matching the customer with the best SAs for the customer's needs on an opportunity-centric and customer-centric basis, bringing the most appropriate SA to the opportunity, and then providing that SA with the necessary tools to complete the sale (both data assets and communication functionalities). This should be compared to current eCRM solutions that merely provide access to a call center representative who is inadequately trained to answer questions about products or suggest reasonable alternatives to the customer. By establishing rules-based, personalized, human interaction, defined and identified as a function of the browsing customer's needs and interests, as part of the sales process rather than waiting for a customer to ask for assistance, the present invention dramatically improves the e-commerce experience. Additionally, the present invention allows for an SA to have a relationship with the customer (rather than the "database" building a relationship with the customer), helping to facilitate a smoother transition (from a customer experience perspective) from a bricks and mortar purchasing experience. Further, the present invention provides an intelligent, personalized solution—not an artificially intelligent, mechanized solution. Finally, the present invention contemplates a series of real-time communication functionalities—chat, VOIP, streaming media and, importantly, the PSTN—that bridge the online and offline channels and make the online experience far more robust from a selling perspective.

Perhaps the most compelling reason for increasing customer satisfaction by using SAs is to increase customer loyalty. Repeat customers visit a site twice as often and spend one-third more than the casual visitor. SAs can be expected to establish ongoing relationships with customers, increase spending per customer, as well as growing the number of repeat customers.

BRIEF DESCRIPTION OF THE DRAWINGS

FIG. 10 is a screen shot of a Certification function of the SA user interface.

FIG. 11 is a flow diagram of the sales process according to an embodiment of the present invention.

DETAILED DESCRIPTION

Figure 1:
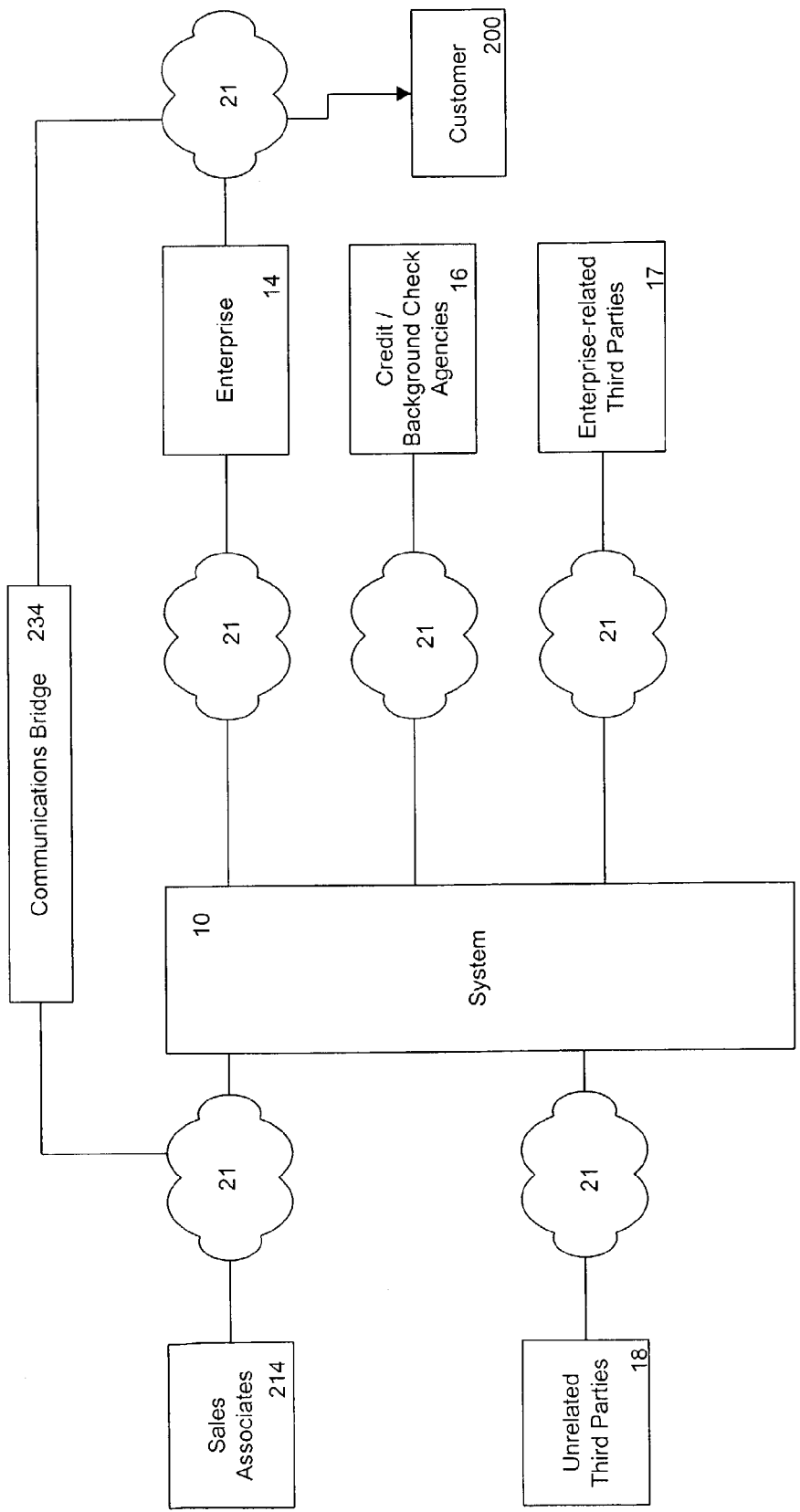
FIG. 1 is a functional diagram illustrating the external connectivity of a preferred embodiment of a system for linking sales associates with customers according to the present invention.

FIG. 1 shows the connectivity of an embodiment of the system 10 of the present invention to other entities. System 10 can interface with other external entities, sales associates ("SAs") 214, enterprises 14, credit/background check agencies 16, enterprise related third parties 17, and unrelated third parties 18. System 10 is indirectly connected to customers 200 through the enterprise 14. System 10 matches a customer with the best qualified SA or SAs based on predetermined criteria and provides the SAs with sales tools and information to enable SAs via SA-facing web pages to ably assist customers to make purchases at the enterprise's website. Further communication between the SAs and customers is facilitated by the communication bridge 234. System 10 further provides enterprise-facing web pages to enable the enterprise to monitor the sales process.

An enterprise, as previously described, can be any organization or institution that engages in the selling of products, goods, or services of a complex nature. Retailers, insurance companies, real estate companies, auctions, professional services firms, travel agencies, financial institutions, stock brokers, and others similarly situated fit within the broad and limitless profile of organizations who utilize the systems and processes according to the present invention.

SAs can work for the enterprise, Captive SAs (CSA), or can be Independent SAs (ISA), who represent the same product or set of products as independent contractors for a number of different enterprises.

Examples of some enterprise related third parties 17 are the enterprise's CRM or eCRM system, the enterprise's ERP system, the enterprise's data mining/analytics/marketing platforms, the enterprise's human resources system, and the enterprise's inventory, accounting and other back office systems. Unrelated third parties 18 are parties that have relevant information to assist in the selling process, such as Consumer Reports, the Wall Street Journal and even conceivably a competitor's website (assuming a comparison of the primary vendor's offering with the competitor's offering will reflect favorably on the primary vendor's offering). Credit/background reporting services 16 are any service that provides information on a person's credit history, criminal record, and other personal background information. These services can be accessed to verify the identity of an SA or assist an enterprise in accrediting an SA (the latter function is particularly important insofar as the enterprise is engaging ISAs, who are unlikely to be known to the enterprise, as independent contractors). In CSA scenarios, this information will most likely be passed from the enterprise's ERP and/or HR system directly to the system.

System 10 may take the form of a network of desired systems, computers, or other functionality, located in one or more geographical locations, running any desired operating systems and applications. In one embodiment, system 10 is J2EE compliant and is implemented on a Sun Microsystems, JAVA-based architecture and in another embodiment system 10 is implemented in a Linux-based system. System 10 may be connected to the sales associates 12, enterprises 14, credit/background check services 16, and enterprise related third parties 17 and any other desired entity via public or private packet switched or other data networks including the Internet, circuit switched networks, such as the PSTN, wireless network, or any other desired communications infrastructure 21. Server is used herein to refer to an application on an individual server or a portion of a server shared with other applications.

Figure 2:
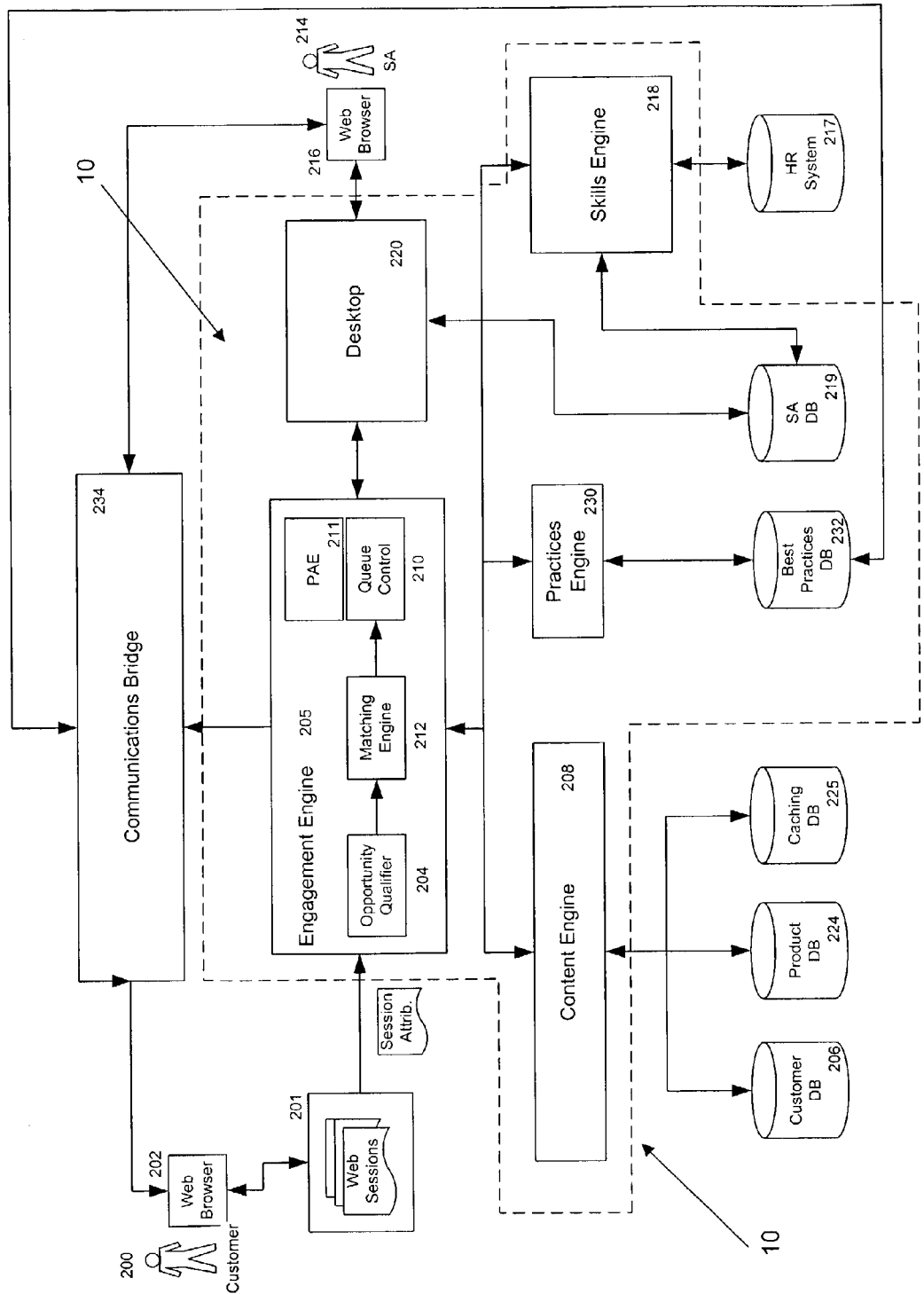
FIG. 2 is a functional diagram schematically illustrating the architecture of the system and the external connectivity of the system with an enterprise.

FIG. 2 illustrates schematically, in more detail, the connectivity and architecture of the system 10 when connected to a particular enterprise. A customer 200 accesses a website at the enterprise server 201 via a web browser 202, such as Internet Explorer from Microsoft Corporation. As the customer is browsing the enterprise's website, the enterprise monitors the activities or session information of the customer 200. A session information message or messages, typically, but not necessarily, passed in XML format, are sent from the enterprise server 201 to an opportunity qualifier 204 in an engagement engine 205. Session information includes a variety of clickstream-derived data, such as, for example, whether the customer has requested assistance from an SA, whether the customer has indicated that it does not want assistance from an SA, the page on a website that the customer is viewing, and/or the goods or services the customer is examining on that page, demographic or other information about the customer extracted from the web page the customer is examining (such as the value of a mortgage that the customer is seeking, extracted from a mortgage calculator the customer is filling out), the contents of the customer's shopping cart, the time that the customer has looked at a given product on a given Web page, the customer's surfing pattern, the identity of the customer, and the customer's past purchasing history with this enterprise.

The opportunity qualifier 204 may also receive customer information about the customer 200 from a enterprise's customer database 206 via a content engine 208. The content engine 208 accesses the customer database through, for example, the enterprise's eCRM system. The customer information may include some or all of the following information: the customer's name, address, past purchase information, past SAs used, items of interest, past site activity, and recommended purchases based on past purchasing history, if such information is available about the customer. Based on the session information and/or the customer information received, the opportunity qualifier 204 determines whether the customer represents a sales opportunity, based on a set of rules of engagement from the enterprise and whether the customer has requested assistance ("reactive must"), has not requested assistance but should be approached for assistance ("proactive must"), or has not requested assistance but potentially could use assistance ("proactive can").

If the opportunity qualifier 204 determines that the customer represents a sales opportunity and thus, wants or could use help from an SA, the opportunity qualifier 204 sends an XML opportunity message to an Expert Sales Availability Choice Technology ("ExSACT") matching engine 212. The opportunity information sent to the ExSACT matching engine 212 from the opportunity qualifier 204 includes session information and customer information.

An SA connects to the system 10 either through the enterprise's internal network ("intranet") and/or through a web browser 216, such as Internet Explorer from Microsoft Corp. Before beginning to assist customers with specific goods or services, an SA must register with the system and must be accredited to sell the specific goods or services. An SA registers, trains and obtains certification via a skills engine 218. The Skills engine 218 may also receive performance data regarding SAs from the enterprise's existing ERP/HR systems 217. Performance data includes such things as the SA's performance ratings within the enterprise (based on an unlimited variety of performance criteria, including revenues, the SA's return or rescission rates, etc.), and any accreditations or licenses to sell certain products. This information on individual SAs is stored in the SA data base 219. The skills engine 218 also continually gathers information concerning sales transactions and the performance of the SAs within specific transactional contexts, and generates reports on the transactions as wed as performance reports on the SAs. Such sales transaction information includes, for example, whether customers accepted sales assistance from a SA, whether the sales transaction resulted in a sale, the amount of the sale, and the products sold or attempted to be sold. The skills engine 218 can include accounting applications to monitor the sales made over the system and manage the payment of SAs and invoicing of the enterprises. The system also includes applications that monitor and generate reports on the enterprises and customers and can be provided to the enterprise offline or online via enterprise facing web pages. If the system is used with independent SAs, the system connects with credit/background reporting services so that background and credit reports of the SA can be obtained. This information is likely not necessary with a captive SA.

Once an SA is online, registered, and certified, the SA can access the desktop 220. When an SA is logged into the desktop 220, the SA's profile information is sent to the ExSACT matching engine 212. An SA's profile information includes, for example, the SA's name, products or services accredited to sell by the system, and performance data with respect to the SA's performance using the system. The SA's profile information is continually updated by the system. Based on the profile information of the currently available SAs, customer information (if available), and session information, the matching engine creates an ordered list of available SAs best suited to assist the customer. The matching is done in a variety of enterprise- and system-specified ways, as explained in more detail below. The list of SAs is sent from the matching engine to the queue control 210. The queue control receives the lists of matched SAs for all opportunities and establishes and updates a customer queue for each available SA. The customer queue includes reactive must customers, proactive must customers, and proactive can customers that have been matched to the SA. The queue control 210 makes the customer queues available to each SA and constantly updates each SA's customer queue.

A predictive approach engine 211 is connected to the queue control 210. If the predictive approach engine 211 is enabled, the predictive approach engine takes over the customer queues of SAs, approaches opportunities for SAs, and passes customers desiring assistance to SAs. The predictive approach engine can do this for a single SA or for a group of SAs. When enabled, the predictive approach engine 211 saves the SAs the time of manually approaching the customers in their customer queues and waiting for a response and frees the SAs to work on other tasks until a customer is linked with the SA by the predictive approach engine. The predictive approach engine contacts customers via the Internet through communications bridge 234. The operation of the predictive approach engine 211 is explained in more detail below in connection with FIG. 6.

The desktop 220 presents the SA with a communication user interface in the form of web pages through which the SA can monitor customers on the enterprise's website, interact with and assist the customers, interact with other SAs, and access various goods, services, best practices, and external information. The SA can take over the customer's navigation through the enterprise's website or can take the customer to a third party website. The collaboration feature can be provided by collaborative browsing tools from companies such as TogetherWeb, HipBone, and Cisco.

The desktop 220 receives product and catalog information from a product data base 224 via the content engine 208. The content engine 208 accesses the product data base 224 via, for example, the enterprise's ERP system. The types of product information include, for example, product specifications, collateral products (e.g., like products or product substitutes at varying price points), warranty information, product competitive data, comparative product information from other competitive enterprises and upsell and cross-sell information. The types of catalog information include, for example, inventory information (availability or backlog), pricing information, promotional or sale information, terms of sale, and commission information.

The desktop 220 receives external information from a caching database 225 via the content engine 208 and from a best practices database via a practices engine 230. The practices engine 230 collects and organizes in the caching database 225 and the best practices database 232 external materials such as product slicks, magazine articles, competitor comparisons, third-party financial calculators and comparison engines—essentially, any kind of information whether provided from the enterprise, from third parties and made available digitally (including information available on the Web) or from SAs in past selling situations (such as a good 'pitch' to use in a given sales scenario).

Product, catalog, and external information is gathered electronically, either passed from the product database 224 in the case of internal information, or, in the case of external information, generated from a baseline of external sources approved and established by the enterprise and captured through usage of the system over time. This information is then presented to the SA by the desktop 220. Product, catalog, and external information can be collectively referred to as sales information.

The desktop 220 receives best practices information from the best practices data base 232 via the practices engine 230. The practices engine 230 monitors all communication, data, external information, and resources (collectively "assets") used by an SA during a sales encounter and for a particular product or service. All of this information is then cataloged by enterprise, vertical and/or product as well as scored based upon the outcome of each related sales interaction to formulate a set of best practices. The best practices information is then stored in the best practices data base 232. The practices engine 230 indexes all aspects of the sales transaction (e.g., text transcripts of online chat sessions, audio transcripts of voice over IP sessions and/or telephone sessions, browser driving, etc.) in a manner that allows the practices engine to point-deploy dynamic best practice detail against the specific parameters of each sales engagement. During a sale, an SA has access to these stored best practices and external information through the desktop 220 to assist closing the sale, as discussed below with reference to FIGS. 8 and 9. The practices engine builds a correlation between the assets used, the use of an asset in a given opportunity, and how many times the asset was used successfully. This information can also be provided to enterprises offline or via enterprise facing web pages on the desktop 220, as it provides them with valuable customer behavior data.

Further communication between SAs and customers is facilitated by communication bridge 234. Communication bridge 234 facilitates methods of communication such as by telephone, instant messaging, web collaboration, web conferencing, e-mail, and voice over IP. The telephony side of the communication bridge 234 is known in the art and made by such companies as J2 Global Communications and Z-Tel Communications and the instant messaging and web collaboration side of the communications bridge is known in the art and made by such companies as Cisco, TogetherWeb, and HipBone. The communication bridge 234 can be internal or external to the system 10. Through this communication bridge, a customer/SA sales engagement commenced in chat online can be bridged through such a third-party to a PSTN-based conference call. This bridge is established either by the SA providing the customer with a toll free number to call or by the customer providing the SA with the customer's telephone number so that the SA call establish a telephone call with the customer via the communications bridge 234. In that conference call, if the SA has access to both a phone line and the Internet, the SA and customer can communicate via voice, while still maintaining a co-browsing session on the Internet, i.e., the SA can talk to the customer while navigating the customer through the Internet.

Figure 3:
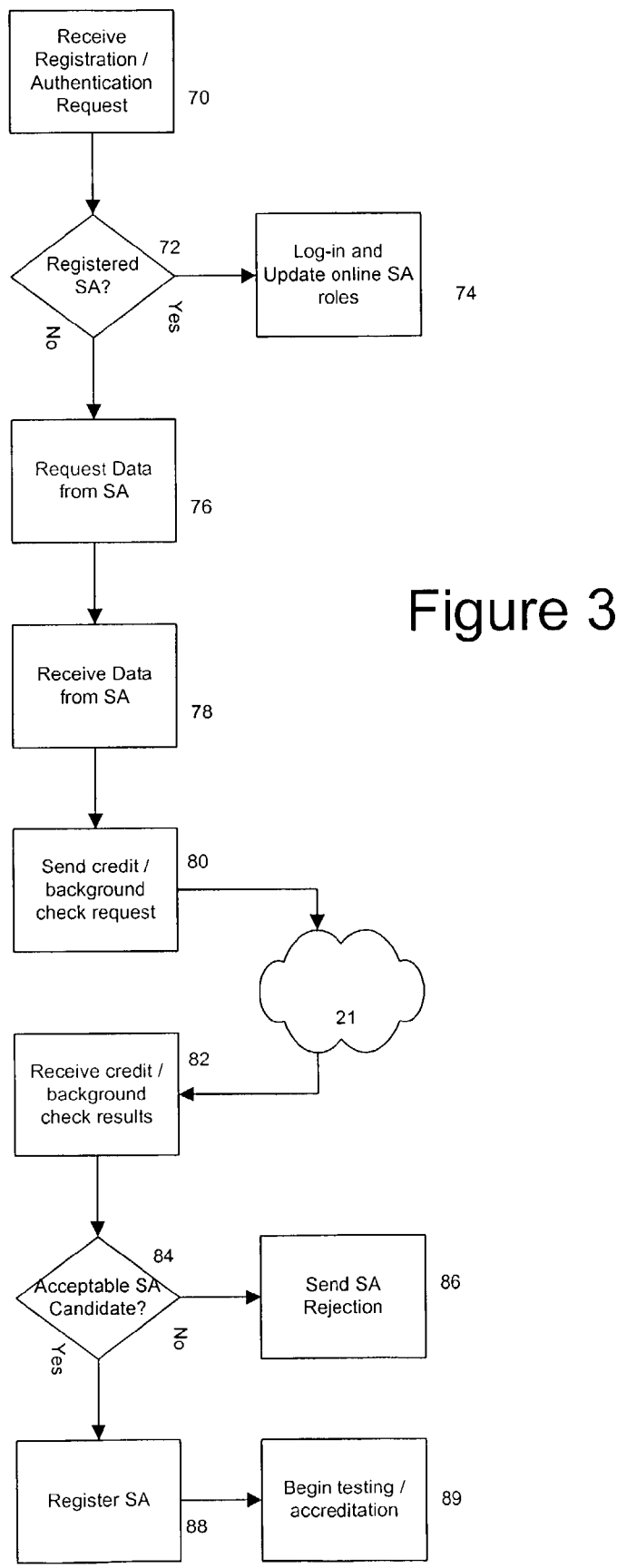
FIG. 3 is a flow diagram illustrating the registration and authentication process according to one embodiment of the present invention.

FIG. 3 provides a flow diagram of the registration and authentication process according to one embodiment of the present invention. At 70, the Skills engine 218 receives a registration request. At 72, the Skills engine 218 unit determines if the requester is a registered SA by the SA entering a preselected username and password or other identification verification mechanism. If the SA is registered with the system, the Skills engine 218 logs the SA in and updates its records of online sales agents, as shown at 74. If the SA is not registered, the Skills engine 218 requests sales associate information from the SA, as shown at 76. The requested sales associate information may include personal (including a picture), historical, and other core data, such as, the name, address, and phone number of the sales associate, the job title and status of the sales associate, how many years the sales associate has been in this job or related jobs, the products the sales associate is interested in selling or is accredited to sell (this could be in ranked order), and the sales associate's preferred schedule. The skills engine may also request and receive some enterprise sales associate information on the sales associate. This enterprise sales associate information includes, for example, the SA's employment history, performance data on the SA (revenues, rescission rates, etc.), and the products the SA is accredited or licensed to sell. Sales associate information and enterprise sales associate information is collectively combined with any other SA performance data to create an SA profile on each sales associate. If this is a captive sales agent (CSA), the CSA may be required to include security information to establish that she can sell for the particular enterprise. Alternatively, a CSA for a particular enterprise can register via a enterprise-specific URL to determine the CSA relationship.

At 78, the sales associate information is received from the SA. For fraud protection, the Skills engine 218 may cause a request to be sent to a credit/background check agency as shown at 80. This request may be sent directly from the system to the agency online or may be done offline. As a result, the system will be able to authoritatively identify SAs and prevent expelled SAs from gaining re-admittance under an assumed name. At 82, the Skills engine 218 receives the credit and background check data from the agencies. Again this can be done online or can be done offline. The Skills engine can also receive enterprise SA information, such as, for example, product accreditation information, schedule information, and other relevant information and performance data on the sales associate from the enterprise. The Skills engine 218 analyses any credit and background check data, any enterprise sales associate information, and sales associate information at 84 to determine if the SA is an acceptable candidate. If not, at 86, the SA is sent a rejection. If the SA is acceptable, the SA is sent a notification of her acceptance, given further instructions about registering and about the system. The notices can be sent either online or can be sent offline. The SA then may provide the system with her schedule and contact preferences, for example, (i) only when online and "available," (ii) off-line notification preferences, and (iii) off-line notification preferences based on SA-established schedule. At 89, the SA may be required to proceed to the training and accreditation process prior to completing the registration process based rules defined by the system or enterprise.

Figure 4:
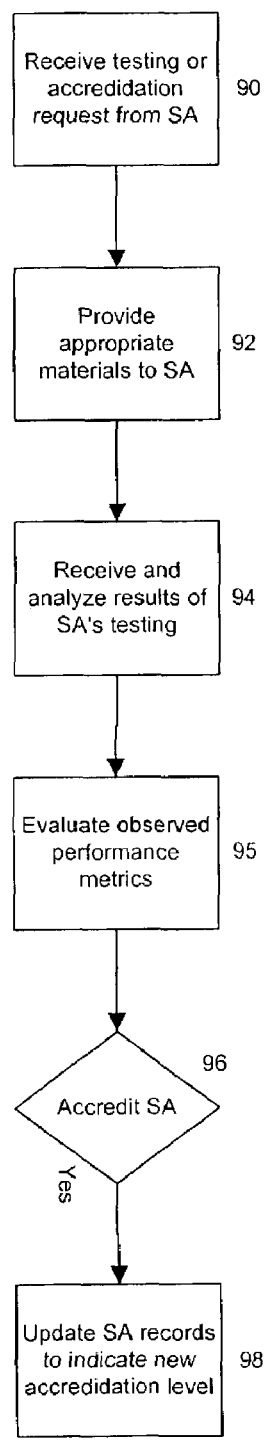
FIG. 4 is a flow diagram illustrating the training and accreditation process according to one embodiment of the present invention.

FIG. 4 illustrates a flow diagram of the training and accreditation process according to one embodiment of the invention. At 90, the Skills engine 218 receives a training or accreditation request from an SA. SAs may be accredited in terms of a merchandise category or a specific product or service. Accreditation standards can be created by the enterprise or the manufacturer, but in any event are published by the system. In response, at 92 the Skills engine 218 causes the appropriate materials to be provided to the SA. The materials can be provided to the SA online or can be sent to the SA offline. It is not necessarily objectionable that SAs could "cheat" the testing process by, for example, taking the test on an "open book" basis since they can also "cheat" in the same manner during the online sales experience. The materials could be established by the enterprises or by the manufacturers of certain products. The training materials contain the best practices information captured by the best practices engine 230 and enterprise supplied materials from the product data server 222. At 94, the Skills engine 218 receives and analyzes the results of the SA's training or accreditation and then at 95 the Skills engine 218 evaluates the observed performance metrics. At 96, the Skills engine 218 determines whether to accredit the SA. Then at 98, the Skills engine updates the SA records to indicate any new accreditation levels. Upon accreditation, the SA receives a "license" from the system or the enterprise to sell a specific good or service or category of goods or services. Licenses could also be granted on the basis of other categories as well, such as by geography, by demographic of the customer (reflected perhaps by customer login information or zip code information) or by any combination of the foregoing (e.g., by product and by demographic).

The testing and accreditation process can be performed online, manually, or a combination of both. The testing and accreditation process gives the system the ability to train and accredit SAs in order to effectively grant licenses to sell specific categories of products, goods, or services. Each enterprise can impose the training or certification level it desires before an SA will be permitted to sell at the enterprise's website.

Figure 5:
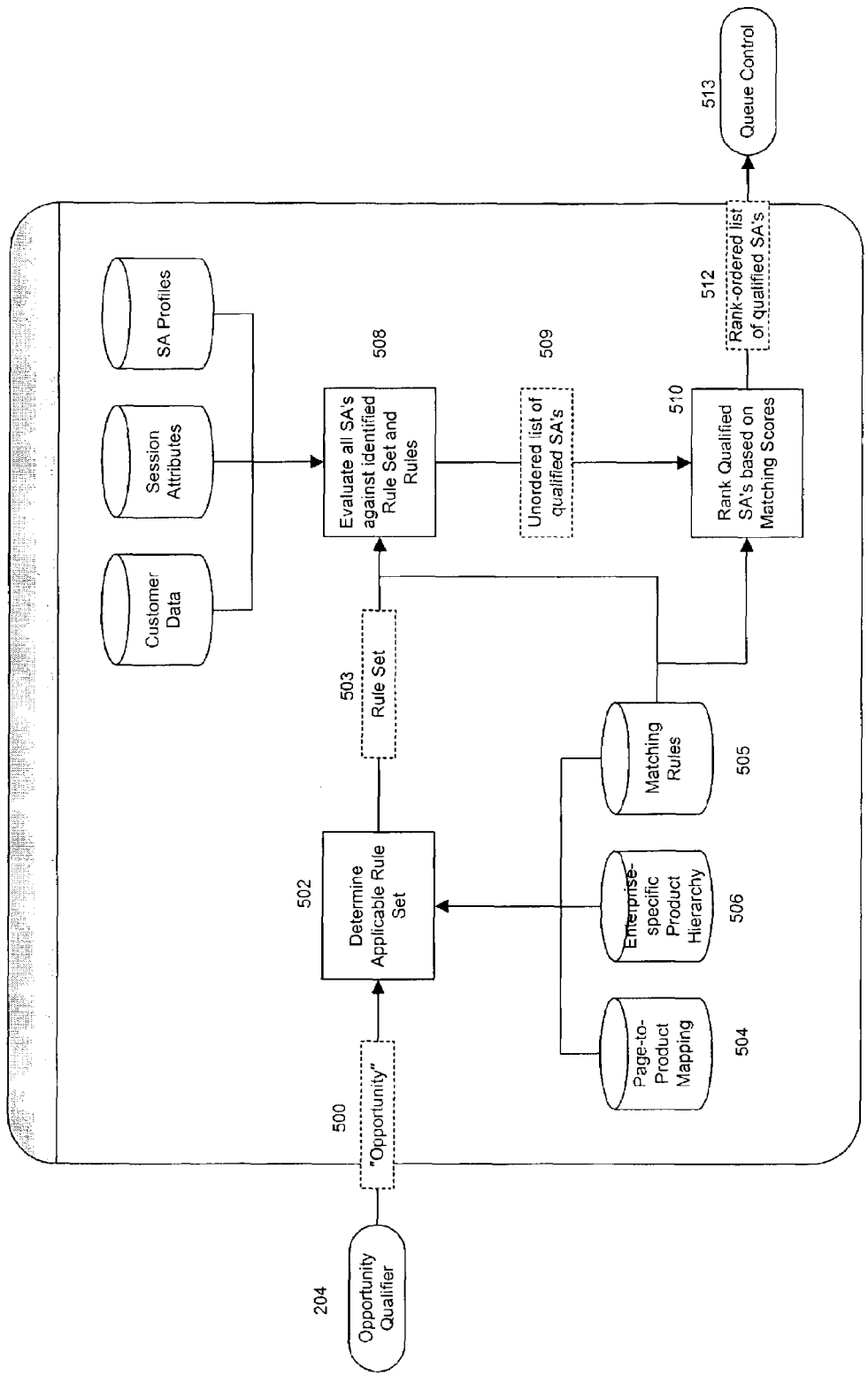
FIG. 5 is a flow diagram illustrating the matching process according to one embodiment of the present invention.

Turning now to FIG. 5, the matching functionality of the ExSACT matching engine 212 assures that the most qualified SA or SAs are matched to each browsing opportunity. The following description of the matching functionality is provided in terms of a captive SA and enterprise or enterprise specific matching, but it is equally applicable to an independent SA selling the same product or set of products as an independent contractor on behalf of a variety of different enterprises.

At 500, the opportunity qualifier 204 identifies a browsing session that represents a sales opportunity (based on session information and, if available, customer information). The opportunity qualifier 204 sends the matching engine a request for SA assistance based on the nature of those parameters. At 502, the matching engine determines the applicable rule set to apply to the matching. The rule set is determined by the product or service the customer is interested in or other "triggers" established by the enterprise (for example, the enterprise could instruct the system to find a qualified sales associate whenever a mortgage calculator involving an original principal balance of $300,000 is engaged). The applicable rule set is determined from page-to-product mapping 504, enterprise specific product hierarchy 506, and matching rules 505. Page-to-product mapping 504 decodes the URL information from the session attributes to determine what product the customer is looking at. The page-to-product mapping 504 could be part of the opportunity qualifier 204 or could be separate. The enterprise-specific product hierarchy is then used to determine if the product the customer is interested in has a corresponding rule set. If the specific product does not have a rule set, then the lowest applicable rule set is determined from the hierarchy. The appropriate rule set is then selected from the matching rules 505.

Once the appropriate rule set 503 is determined, at 508 the matching engine evaluates all SAs against the rules of the chosen rule set. First, at 509, an unordered list of qualified SAs is produced. The matching is dynamically performed by weighing customer information, session information, and SA profile information according to the rule set, and each qualified SA is given a matching score. The SA profiles are continually updated by the system to provide the most current information for the ExSACT matching engine. The matching score is based on the relative ranking of each SA within the bounds of a particular rule multiplied by the relative importance of that rule among all the rules for a particular rule set. At 510, the matching engine ranks the SAs based on the resulting matching scores. A list is generated of qualified SAs in rank order at 512. Then at 513, the list is then sent to the queue control. As described previously, the queue control receives the list of matched SAs for all opportunities and established and updates a customer queue for each available SA.

In one embodiment, the desktop 220 provides a simple user interface, for example, enterprise-facing web pages, to the ExSACT matching engine 212 for the enterprise to change the matching rules, introduce new rules, or reweigh existing rules for the matching engine. The matching engine also dynamically changes the matching rules based on various factors, such as sales successes or changing market conditions. Through this dynamic ranking feature, the matching engine produces "up-to-the-minute" opportunity matching based on criteria established by the enterprise and the success of the SA base in using the system.

With the predictive approach engine function disabled, depending on the enterprise's preference, the queue control alerts the SA with the highest matching score for a customer that she must contact the customer, alerts qualified SAs at the top of the generated list that a customer needs assistance, or simply provides the SAs with their matching score and lets the SAs decide whether to contact the customer. With the second option, the SAs then "race" to the customer and the first SA to respond assists the customer. The SAs, in all scenarios, are notified through the desktop communication user interface, instant messaging, e-mail, telephone, wireless device, and/or any other applicable means and may be provided with their matching score. If the pool of available SAs is low, the matching application can cause SAs to be contacted via instant messaging, e-mail, telephone, wireless device, and/or any other applicable means to get online. Again, the SAs are contacted through a variety of means.

Figure 6:
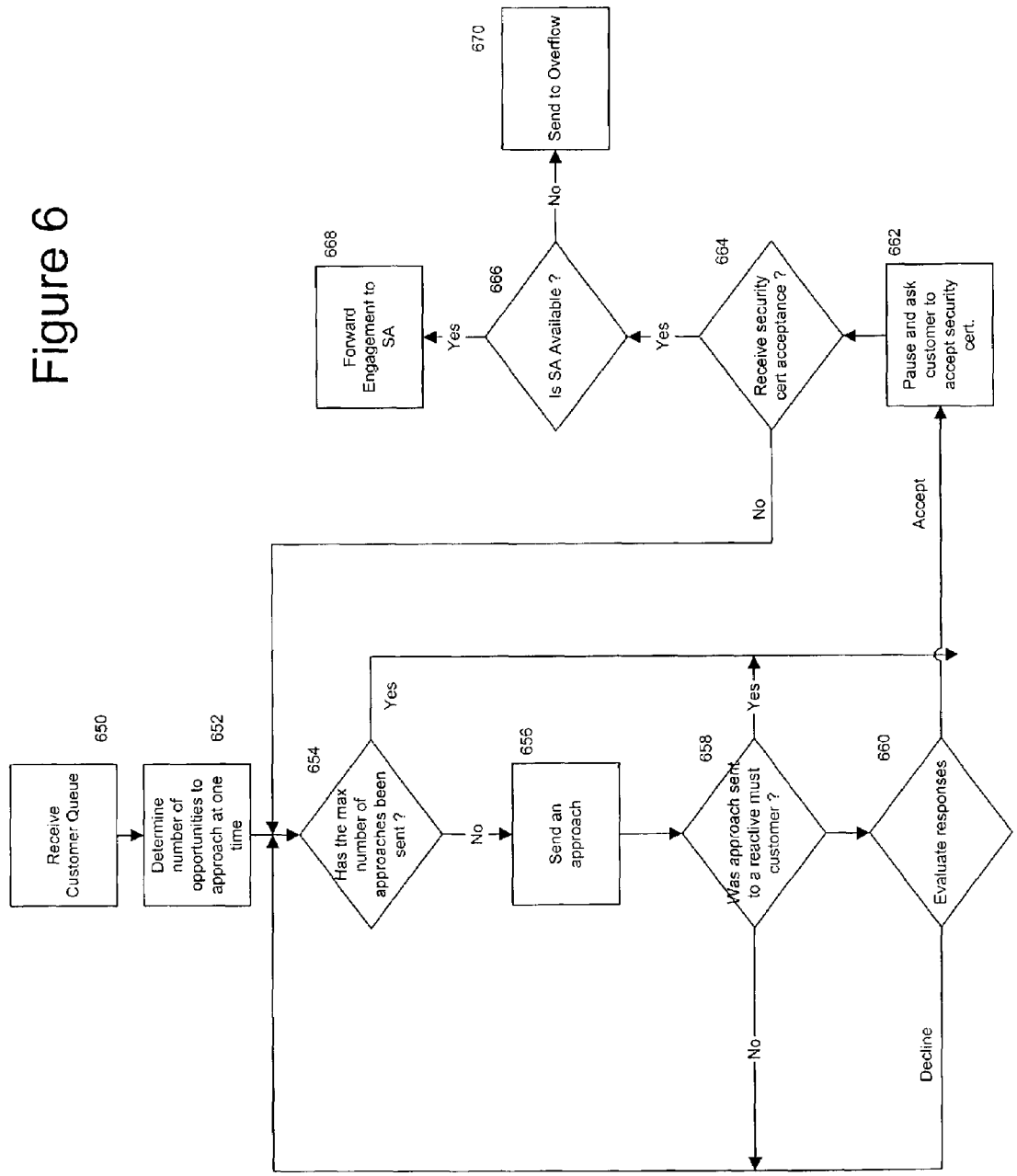
FIG. 6 is a flow diagram illustrating the predictive approach processes according to one embodiment of the present invention.

FIG. 6, illustrates the operation of the predictive approach engine for one embodiment when the predictive approach engine is working for a single SA. At 650, the predictive approach engine receives the customer queue for the SA. The customer queue is in ranked order, such that the top scored match for the SA is at the top of the queue and the match scores for the SA decrease moving down the queue. At 652, the predictive approach engine determines how many opportunities it can approach at one time. This is determined by an approach acceptance percentage for the enterprise, a safety percentage, and a target number of engagements. The approach acceptance percentage can be a static figure or can be calculated in real time. The safety percentage is a risk tolerance measure that dictates how much to cut the maximum number of opportunities to approach. The target number of opportunities is the number of customers that an SA can assist at one time. For example, with the approach acceptance percentage of 10%, the safety percentage of 50%, and the target number of engagements of 1, the result is five approaches.

At 654, the predictive approach engine determines whether the maximum number of approaches has been sent. If so, then the predictive approach engine goes to 662 where it pauses (does not send out any more approaches). If not, then the predictive approach engine sends an approach at 656. At 658, a determination is made as to whether the approach was sent to a reactive must customer. If so, then the predictive approach engine pauses at 662. If the approach was not sent to a reactive must customer, then the predictive dialer goes to 654 and determines if the maximum number of approaches has been sent, and also evaluates the responses at 660. If a decline response is received, then the predictive approach engine returns to step 654 (has maximum number of responses been sent). If an accept response is received, the predictive approach engine pauses and asks the customer to accept a security certificate at 662. At 664, the predictive approach engine determines if a security certificate acceptance is received from the customer. A security certificate is accepted by the customer in order to enable the communications bridge to facilitate communication between the two parties.

If a security certificate acceptance is not received, the predictive approach engine returns to step 654. If a security certificate acceptance is received, the predictive approach engine evaluates whether the SA is available to assist the customer at 666. If the SA is available, the predictive approach engine passes the customer to the SA to assist at 668.

Alternatively, the predictive approach engine does not have to wait to receive a security certificate acceptance from the customer before passing the customer to the SA. With this embodiment, the customer and SA could establish communication via chat first and then switch to co-browsing if it is deemed appropriate by both parties for the specific transaction.

If the SA is not available, the opportunity is sent to overflow processing at 670. Overflow processing determines if there are other available SAs that are matched to the same customer. If so, these SAs receive notification that there is a live customer that was approached by another SA and is waiting for assistance. The first available SA to respond to the customer assists the customer. If no SAs respond to the customer or if there are no available SAs, then the customer is notified that the SA is no longer available and that the customer will be contacted in the future.

The predictive approach engine is also capable of operating for multiple SAs. With multiple SAs the operation of the predictive approach engine is similar to the operation described above for a single SA. The main difference is that before contacting a customer the predictive approach engine determines the highest ranked SA for a customer and approaches the customer on behalf of the SA.

Figure 7:
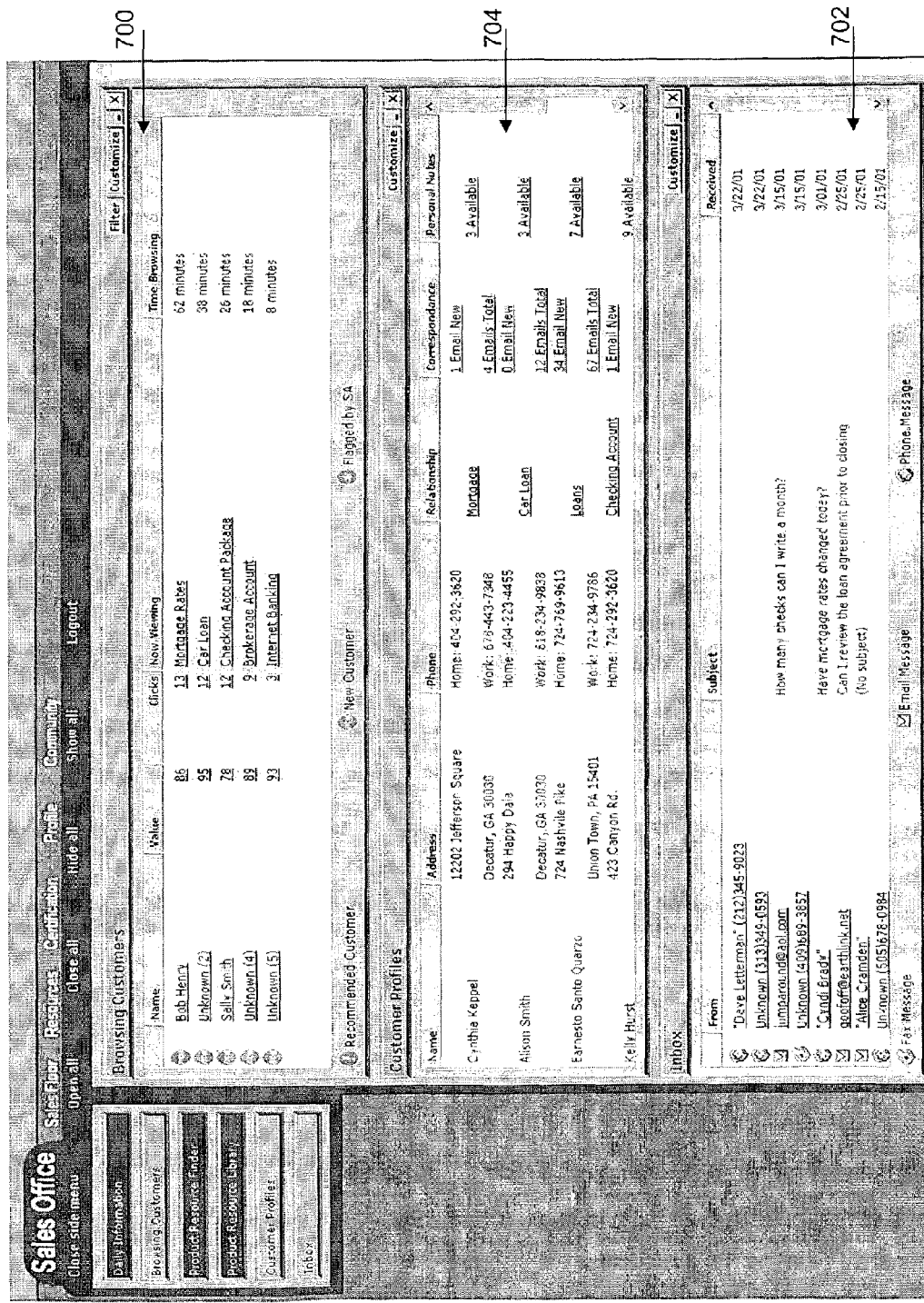
FIG. 7 is a screen shot of the Sales Office function of an SA user interface.

FIG. 7 illustrates a screen shot of the Sales Office section of the SA user interface. The Browsing Customers window 700 displays customers browsing for products that the SA is accredited to sell and that the matching application has matched the SA with. The SA can set the Browsing Customers window to display all customers looking at products, which the SA is accredited to sell, or just customers looking at specific products the SA is accredited to sell. SAs accredited to sell different products would see different views of the aggregate browsing activity at the enterprise's website. The Browsing Customers window 700 specifically displays, inter alia, the name of the customer, if this information is available, the SA's matching score for the customer, the number of clicks the customer has made, what the customer is currently viewing, and the amount of time the customer has been browsing.

To the extent that data is available on the customers, the Customer Profile window 704 displays a list of these customers obtained from the customer data server 208. Basic information about the customer (such as address and phone number) is displayed and a menu of additional information, such as, relationship, correspondence, and personal notes, is displayed. By clicking on one of the menu items additional information is displayed in a More Detail window (not shown). The top left hand side of the screen displays the various functions that are available to the SA at the Sales Office, for example, Daily information, Browsing Customers, Product Resource Finder, Product Resource Library, Customer Profiles and Inbox.

Figure 8:
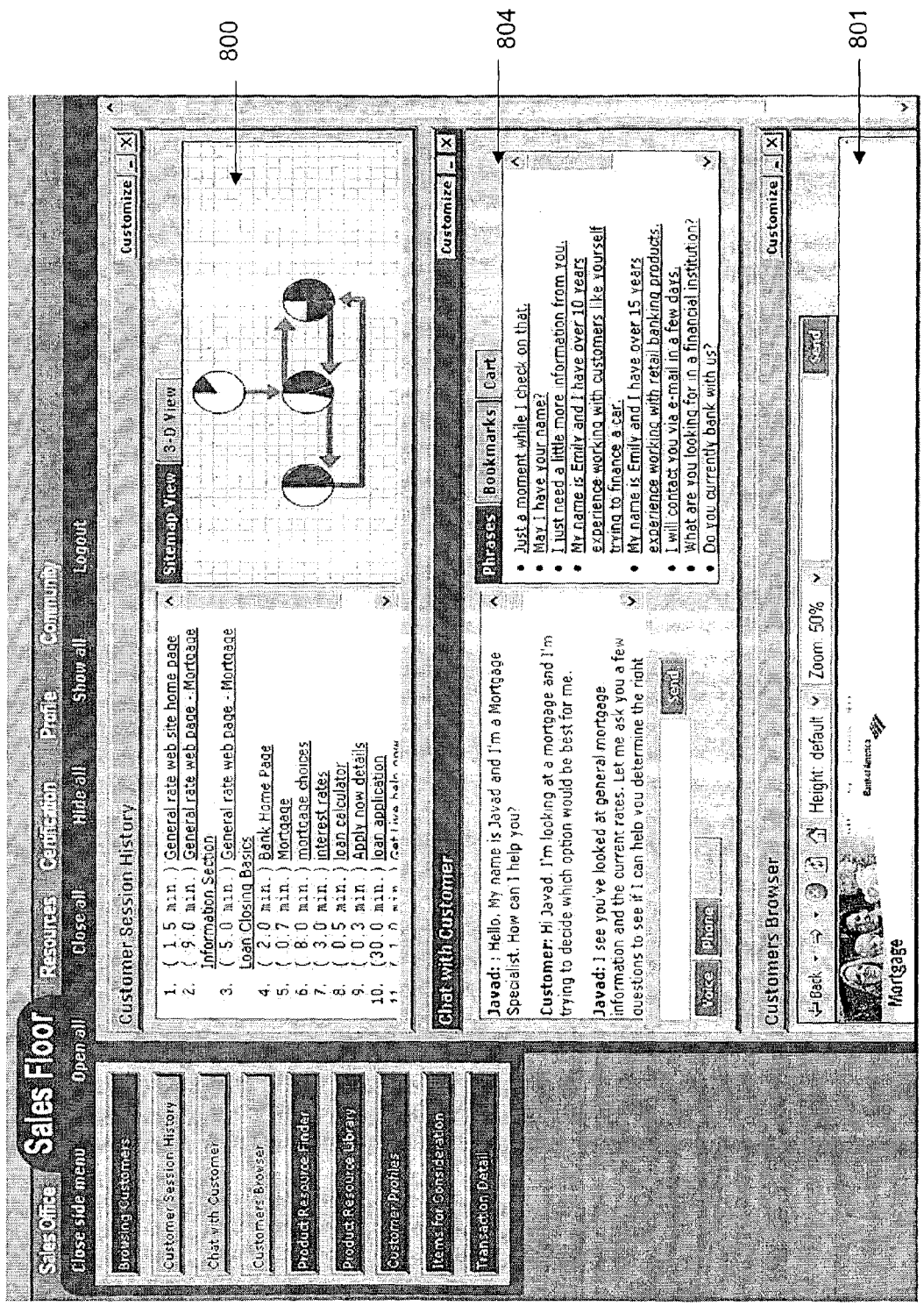
FIG. 8 is a screen shot of a Sales Floor function of the SA user interface.
Figure 9:
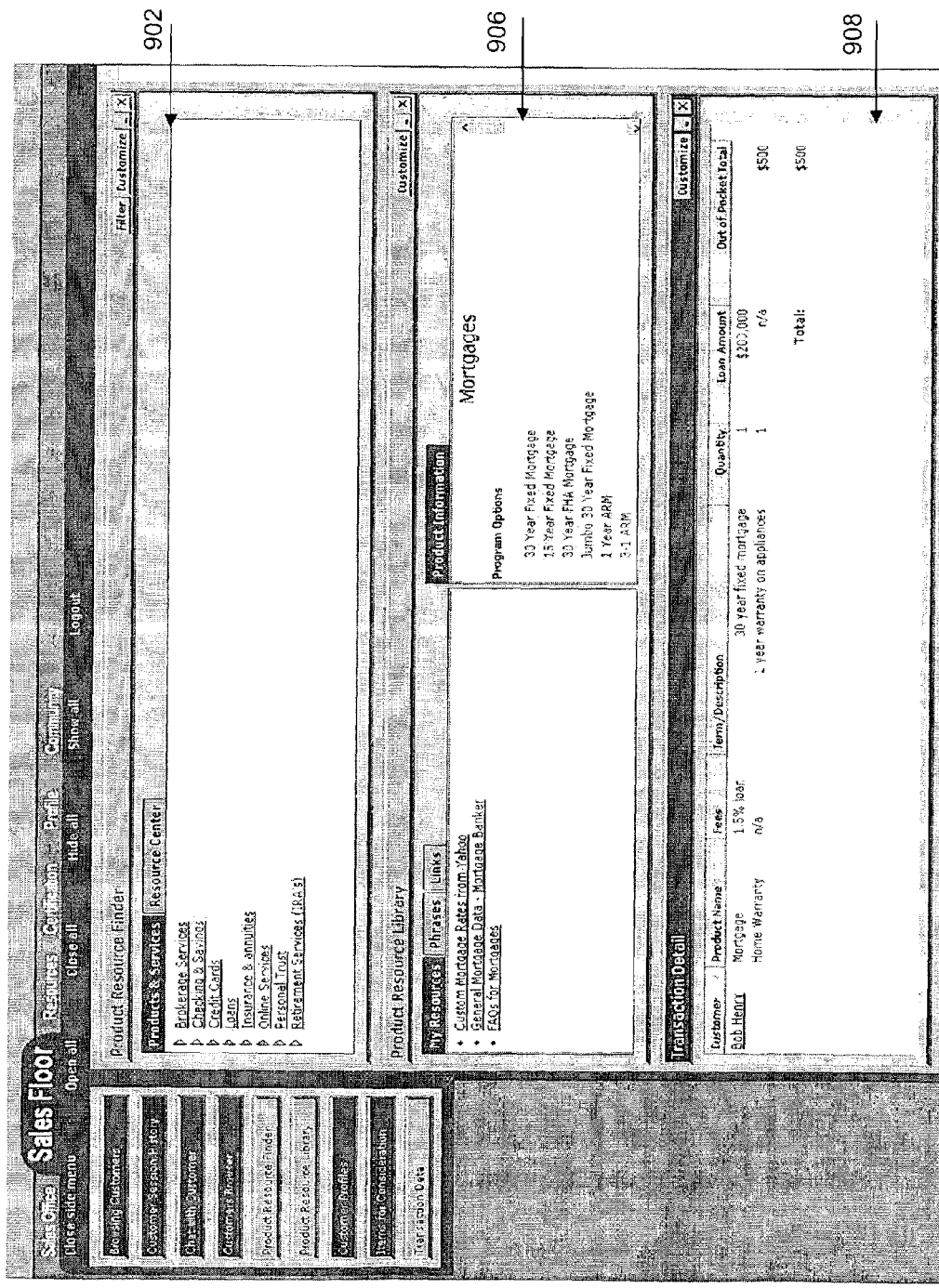
FIG. 9 is a further screen shot of the Sales Floor function of the SA user interface.

When an SA is linked with a customer, a Sales Floor screen is displayed on the SAs user interface as shown in FIGS. 8 and 9. The Sales Floor screen has a Session History window 800 that allows an SA to view the session history of the customer and view a current map of the customer in the website, the current flow of the customer, past maps, and past flows. A Customers Browser window 801 is also displayed on the Sales Floor screen that allows the SA to view what the customer is viewing. If allowed by the enterprise and/or the customer, an SA may manipulate and control the customer's browser and may 'whiteboard' on the pages the customer is viewing.

The Chat With Customer window 804 allows the SA to communicate with the customer. Instant messenger is the method of communication shown in the Customer Interaction window 804, as well as a list of commonly used phrases. The SA and customer can communicate via voice over IP, telephone, e-mail, or on a variety of applicable means. If the customer has the capability to receive a telephone call while connected to the Internet, the SA can connect to the customer via voice over IP or a telephone call over the PSTN through a bridge provided by the system. The customer can continue to view applicable web pages while conversing with the SA.

The Product Resource Finder 902 window allows the SA to select a particular product, for example, loans. The SA can, by clicking on a particular product, obtain additional product and catalog information concerning the product or service. The Product Resource Finder may also be used to assist the SA in identifying related products to be suggested as upsells or cross-sells. The SA can search for products or browse through categories of products. Information is provided to the Product Resource Finder window from the product database 224 via the content engine 208.

The Product Resource Library window 906 is used by the SA to access additional information about a particular product or service. In the example used in FIG. 9, the SA desires more information regarding mortgages. The Item Information window 906 provides the SA with best practices information from the practices engine 230. As explained above, the best practices information includes sales advice, external information, and product and catalog information, such as comparisons to other products, third party information regarding the product, sales pitches, related products, specific product information, warranty information, promotional information, shipping options, and terms of sale.

The Transaction Detail window 908 displays the customer's shopping cart to the SA. The SA, subject to the enterprise's and/or the customer's permission, can manipulate the customer's shopping cart.

Figure 10:
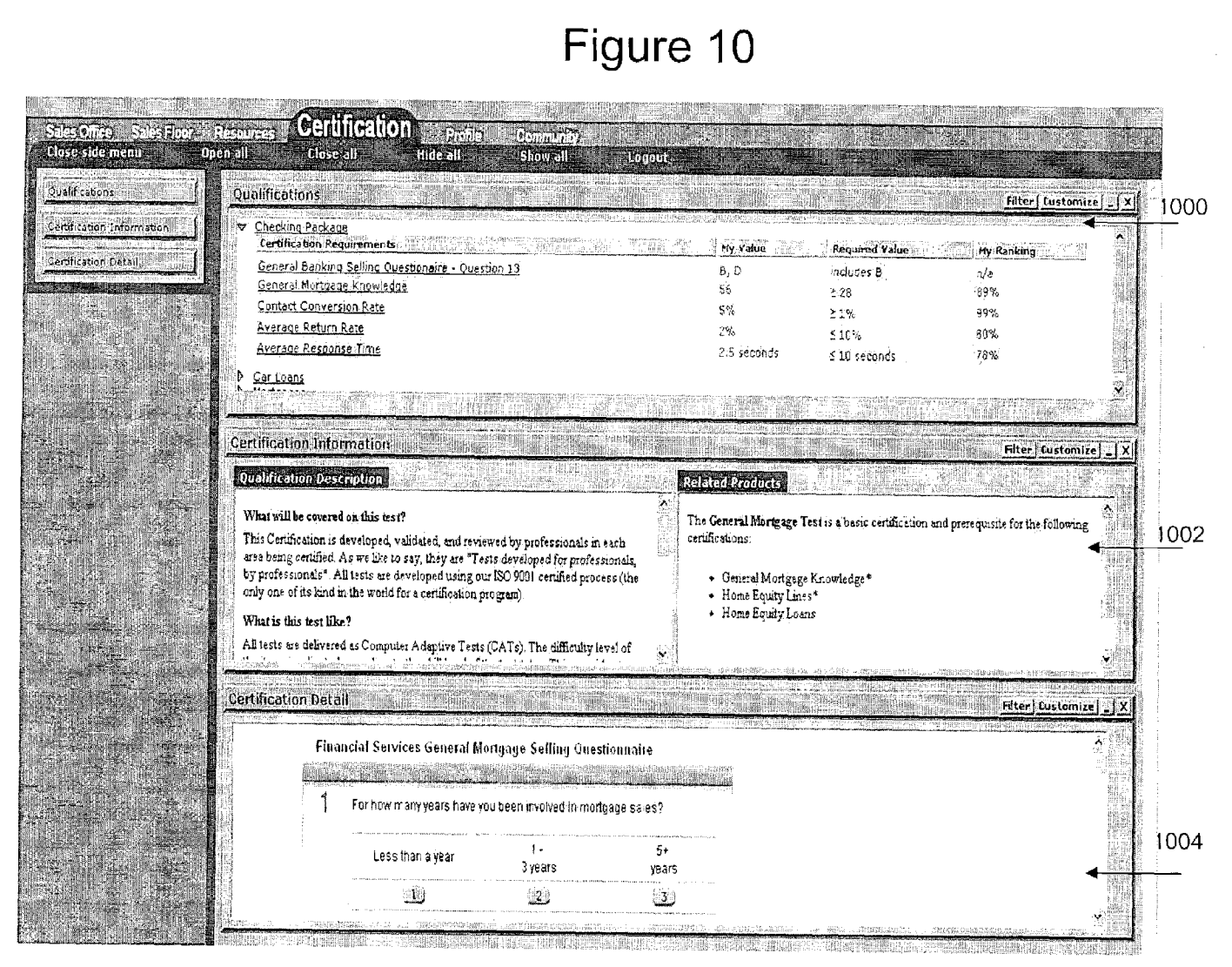

FIG. 10 illustrates the Certification screen of the SA user interface. The Test History window 1000 shows the SA the lists of certifications/tests that the SA has taken, and has available to take. From this screen, the SA can take additional tests, view previous test results, and preview tests that they have not yet taken in order to determine which products and services the certification enables them to sell.

FIG. 11 illustrates a flow diagram of the sales process using the system of the invention with the predictive approach engine activated. At 1100, a customer enters a website. If the customer, is a returning customer of the website, the website greets the customer at 1102. When the predictive approach engine is activated, the predictive approach engine approaches the customer at 1104 and 1106. At 1108, the predictive approach engine receives the customer's response and potentially the customer's security certification acceptance. If the customer does not want assistance, the predictive approach engine disengages at 1110.

If the customer does desire assistance, the predictive approach engine passes the customer to a SA, who then evaluates the customer's needs further through communication with the customer and accessing data on the customer at 1112. At this point, the SA determines the products, features, price range, user, and the customer's product knowledge. The SA then performs research at 1114 using the Product Resource Finder and Product Resource Library information windows shown in FIG. 9 to access the best practices data. The SA directs the customer to specific products at 1116 and provides additional information as necessary to close the sale. The SA can use external (Web) assets as part of the experience, for example, the SA can take the customer to a competitor's website to show the customer the higher prices being charged by the competitor.

The SA evaluates whether the customer made a selection at 1118 and if so suggests related merchandise at 1122. The SA can then perform research at step 1114 on the related merchandise and then the process continues as before. If the customer did not make a selection, the SA further evaluates whether the customer is finished shopping at 1120. If the customer is not finished shopping, the SA evaluates the needs of the customer further at 1112 and the process continues as before. If the customer is finished shopping, the SA offers additional product information at 1124 and reinforces the customer's selection at 1126. The customer proceeds to the enterprise specific check out process at 1128. The SA can assist the customer at the check out process. At 1130, a satisfied customer leaves the website. The SA can follow up with the customer through the methods shown at the bottom of FIG. 11.

Figure 12:
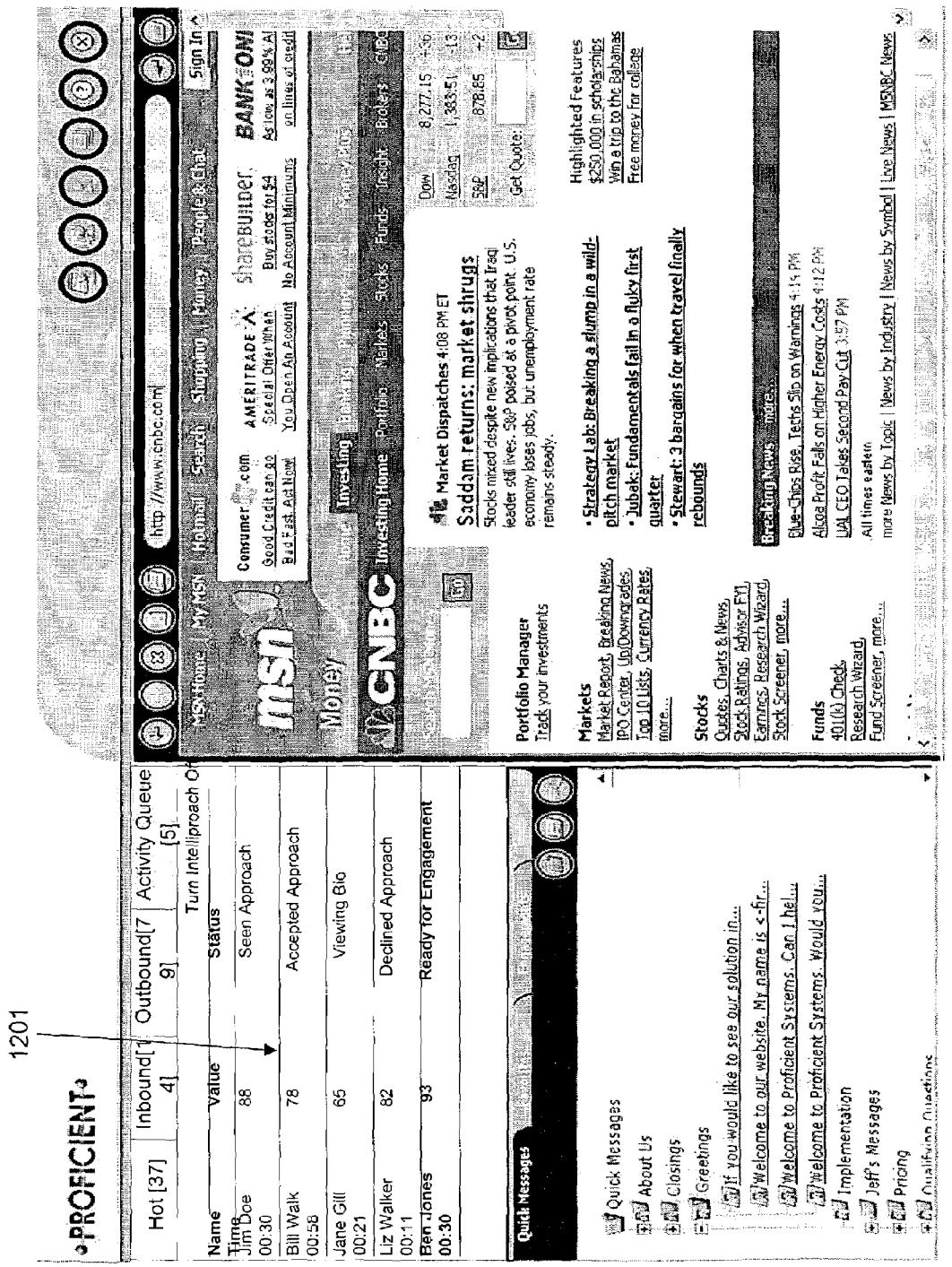
FIG. 12 is a screen shot of the predictive approach engine function of the SA user interface.

FIG. 12 depicts the view provided to an SA that is currently using the predictive approach engine in order to approach the best customers automatically. The SAs Activity Queue 1201 displays the list of customers that have been approached on behalf of the SA, indicating the status of the approach. The status of each customer in the list changes as the customer goes through the approach process, accepting, declining or ignoring the approach, until either the customer is removed from the view, or becomes ready to be engaged. At that point, the SA can select the customer and begin communicating via Chat.

The foregoing is provided in order to disclose the invention in accordance with the patent laws, and more particularly to disclose preferred embodiments of systems and processes according to the present invention. Modifications, adaptations, and changes may be made to what is disclosed without departing from the scope or spirit of the invention, which is to provide systems and processes to facilitate selling on, over, through or in conjunction with the online channel.

What is claimed is:

1. A computer implemented method for engaging sales associates with customers over, through or in conjunction with the Internet, comprising:

receiving session information from a website about customers' sessions on a website of the enterprise, the website being associated with a selected one of a plurality of enterprises and the session information comprising products the customers are searching;

receiving any customer information on the customers from the selected enterprise;

determining from the session information and any customer information whether each customer represents a sales opportunity, based on a set of rules of engagement for the selected enterprise and whether each customer wants or could use assistance from a sales associate;

producing a ranked list of sales associates matched for each sales opportunity, the sales associates being independent from the plurality of enterprises;

creating or updating a customer queue for each sales associate, the customer queue having sales opportunities matched with each sales associate;

for a first sales associate, determining a number of sales opportunities to approach at one time in the first sales associate's customer queue by dividing a target number of engagements by an approach acceptance percentage and then multiplying by a safety percentage;

automatically approaching the customers associated with each sales opportunity in the customer queue for the first sales associate and requesting whether the customer desires assistance from a sales associate until the number of sales opportunities to approach is reached or the customer contacted previously requested assistance from a sales associate;

receiving responses from the customers;

for a response from a customer desiring assistance, determining if the first sales associate is available to assist the customer desiring assistance; and passing the customer desiring assistance to the first sales associate, if the first sales associate is available.

2. The method of claim 1, further comprising if the first sales associate is not available, determining if there are other sales associates that are matched to the same customer and notifying any matched sales associates that the customer desires assistance.

3. The method of claim 1, wherein before the customer is passed to the first sales associate a security certification acceptance is received from the customer.

4. The method of claim 1, wherein sales associates are matched to sales opportunities by applying a matching rule set determined by a product being viewed by the customer.

5. The method of claim 4, wherein the sales associates are matched to sales opportunities dynamically and in real time.

6. A computer system for engaging sales associates with customers over, through or in conjunction with the Internet, comprising:

an opportunity qualifier for receiving session information from a website about customers' sessions on the website, the website being associated with a selected one of a plurality of enterprises and the session information comprising products the customers are searching, for receiving any customer information on the customers from the selected enterprise, and for determining from the session information and any customer information whether each customer represents a sales opportunity;

a matching engine for receiving the sales opportunities from the opportunity qualifier and for producing a ranked list of sales associates matched for each sales opportunity based on the session information and information about the sales associates, the sales associates being independent from the plurality of enterprises;

a queue control for creating or updating a customer queue for each sales associate, the customer queue having sales opportunities matched with each sales associate; and a predictive approach engine for determining, for a first sales associate, a number of sales opportunities to approach at one time in the first sales associate's customer queue by dividing a target number of engagements by an approach acceptance percentage and then multiplying by a safety percentage, for automatically approaching the customers associated with each sales opportunity in the customer queue for the first sales associate and requesting whether the customer desires assistance from a sales associate until the number of sales opportunities to approach is reached or the customer contacted previously requested assistance from a sales associate, for receiving responses from the customers, for determining, for a response from a customer desiring assistance, if the first sales associate is available to assist the customer desiring assistance, and for passing the customer desiring assistance to the first sales associate, if the first sales associate is available.

7. The system of claim 6, wherein the predictive approach engine determines, if the first sales associate is not available, if there are other sales associates that are matched to the same customer and notifying any matched sales associates that the customer desires assistance.

8. The system of claim 6, wherein the predictive approach engine receives a security certification acceptance from the customer before the customer is passed to the first sales associate.

9. The system of claim 7, wherein the predictive approach engine receives a security certification acceptance from the customer before the customer is passed to any matched sales associates.

10. The system of claim 6, wherein the matching engine matches sales associates to sales opportunities based on the session information, the customer information, and information about the sales associates.

11. The system of claim 10, wherein the matching engine matches sales associates to sales opportunities dynamically and in real time.

* * * * *